US011306611B2

(12) United States Patent
Chasalevris et al.

(10) Patent No.: US 11,306,611 B2
(45) Date of Patent: Apr. 19, 2022

(54) SUPRESSING VIBRATIONS OF SHAFTS USING ADJUSTABLE BEARINGS

(71) Applicant: General Electric Technology GmbH, Baden (CH)

(72) Inventors: Athanasios Chasalevris, Coventry (GB); Fadi Dohnal, Lienz (AT)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 15/635,313

(22) Filed: Jun. 28, 2017

(65) Prior Publication Data

US 2018/0003075 A1    Jan. 4, 2018

Related U.S. Application Data

(60) Provisional application No. 62/356,110, filed on Jun. 29, 2016.

(51) Int. Cl.
*F16C 17/02* (2006.01)
*F16C 33/10* (2006.01)
(Continued)

(52) U.S. Cl.
CPC .......... *F01D 25/04* (2013.01); *F01D 25/166* (2013.01); *F01D 25/18* (2013.01); *F16C 17/02* (2013.01); *F16C 17/022* (2013.01); *F16C 17/24* (2013.01); *F16C 23/04* (2013.01); *F16C 33/108* (2013.01); *F05D 2220/32* (2013.01); *F05D 2240/50* (2013.01); *F05D 2260/98* (2013.01);
(Continued)

(58) Field of Classification Search
CPC .......... F16C 23/02; F16C 23/04; F16C 25/02; F16C 25/04; F16C 27/02; F16C 2233/00; F16C 2360/23
See application file for complete search history.

(56) References Cited

U.S. PATENT DOCUMENTS 4,381,128 A * 4/1983 Vohr ........................ F16C 17/03
                                                              384/154
4,497,587 A * 2/1985 Pine ........................ F16C 17/03
                                                              384/117
(Continued)

FOREIGN PATENT DOCUMENTS

| CN | 103075420 B | 3/2015 |
| DE | 38 31 928 A1 | 3/1990 |

(Continued)

OTHER PUBLICATIONS

Translation of DE3831928 obtained Aug. 28, 2019.*
(Continued)

*Primary Examiner* — James Pilkington
(74) *Attorney, Agent, or Firm* — Paul Frank + Collins P.C.

(57) ABSTRACT

A bearing configured to actively damp vibration of a shaft in a turbine. In one implementation, the bearing can include actuating members that move in a manner that changes properties of fluid, typically a thin film of lubricant, disposed in the bearing to facilitate rotation of the shaft. These changes effectively manipulate the stiffness and damping of the thin film according to a time periodicity that matches a parametric anti-resonance of the bearing. In turn, the resulting interaction of vibrating modes is favorable to damp vibration amplitudes at critical speeds.

14 Claims, 17 Drawing Sheets

(51) Int. Cl.
*F01D 25/16* (2006.01)
*F16C 23/04* (2006.01)
*F01D 25/04* (2006.01)
*F16C 17/24* (2006.01)
*F01D 25/18* (2006.01)

(52) U.S. Cl.
CPC ...... *F16C 2233/00* (2013.01); *F16C 2360/00* (2013.01); *F16C 2360/23* (2013.01)

(56) References Cited

U.S. PATENT DOCUMENTS

| | | | |
|---|---|---|---|
| 4,643,592 A | | 2/1987 | Lewis et al. |
| 5,374,025 A | * | 12/1994 | Whelpley ............. F16F 7/1017 188/378 |
| 6,129,453 A | * | 10/2000 | Holopainen ......... D21G 1/0226 384/100 |

FOREIGN PATENT DOCUMENTS

| | | |
|---|---|---|
| JP | S63-92814 A | 4/1988 |
| WO | 97/45651 A1 | 12/1997 |

OTHER PUBLICATIONS

Chasalevris, A., et al., "Enhancing stability of industrial turbines using adjustable partial arc bearings," Oil & Gas, pp. 1-15 (2016).
Chasalevris, A., et al., "Modal interaction and vibration suppression in industrial turbines using adjustable journal bearings," Oil & Gas, pp. 1-12 (2016).
International Search Report and Written Opinion issued in connection with corresponding PCT Application No. PCT/EP2017/066222 dated Aug. 16, 2017.

* cited by examiner

SUPRESSING VIBRATIONS OF SHAFTS USING ADJUSTABLE BEARINGS

CROSS-REFERENCE TO RELATED APPLICATIONS

This application claims the benefit of priority to U.S. Provisional Ser. No. 62/356,110, filed on Jun. 29, 2016, and entitled "SUPPRESSING VIBRATION OF A SHAFT ON SLIDING BEARINGS," the content of which is incorporated herein by reference in its entirety.

BACKGROUND

Bearing elements enjoy wide use in industrial machinery. A hydrodynamic journal bearing is a type of mechanical bearing element that uses a hydrodynamic oil wedge to separate a rotating shaft from a bearing housing shell (or "sleeve"). The lubricant forms a thin fluid film that separates the rotating shaft from the bearing. During operation, this thin film provides operating clearance that drastically reduces friction so that the shaft can rotate freely relative to the stationary shell.

SUMMARY

The subject matter of this disclosure relates generally to improvements in journal bearings. Of particular interest herein are journal bearings that are configured to vary in geometry to change thickness of the thin fluid film. These configurations can, in turn, periodically modulate fluid film properties (e.g., stiffness and damping) to deliberately introduce parametric excitation. For industrial equipment, like turbo-machinery that employs journal bearings to support a rotating shaft, the variable geometry journal bearing is useful to suppress vibration in the rotating shaft at critical speeds, to extend stability margins, and to better align the shaft to address potential misalignment that may result from manufacture or operation of the system (distortion). The term "turbo-machinery" can embody turbines and power generating equipment, as well as pumps, compressors, and blowers, wherein at least one difference between different types of equipment may reside in the operating pressure of working fluid that exits the machine.

Practice has been to replace fixed, cylindrical bearings with various types of "adjustable" bearings. These devices afford some level of control over operating properties. Examples include multi-lobe elliptical or tilting-pad designs. Other designs may use moveable elements or "bearing pads" to modulate geometry of the bearing housing. Still others try to apply external forces, like magnetic or piezoelectric, without changing the clearance geometry found between the shaft and the bearing housing.

Some embodiments herein may be configured to also replace fixed, cylindrical bearings. But these configurations also address some of the shortcomings of these other bearing designs. For example, magnetic bearings often take up too much space for use in turbo-machinery and reliability may be questioned. More generally, however, is that journal bearings may fail to provide adequate instability mechanisms that can appropriately suppress vibrations of the rotating shaft at critical speeds in turbo-machinery.

DRAWINGS

Reference is now made briefly to the accompanying drawings, in which.

Figure 22:
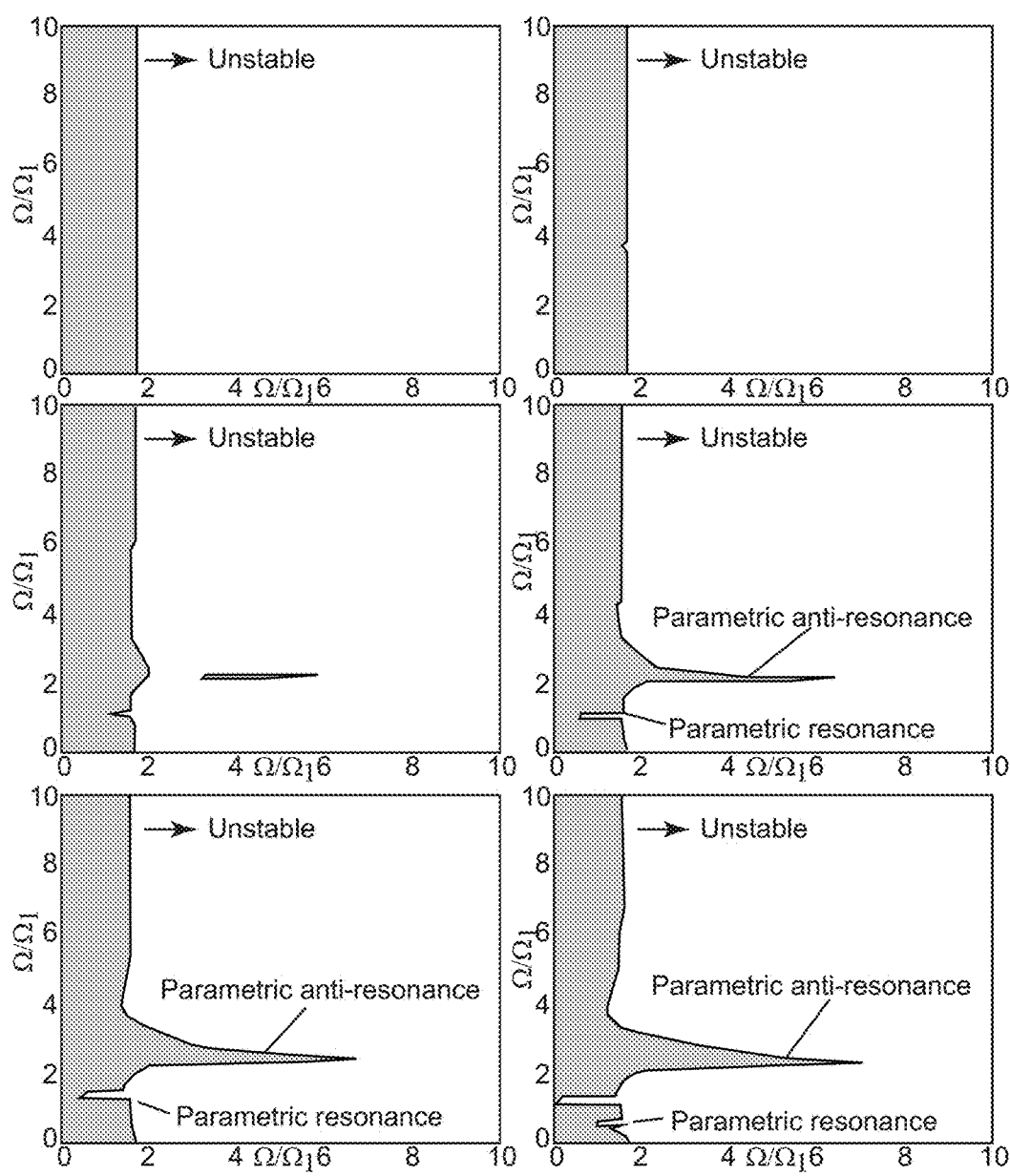
Figure 23:
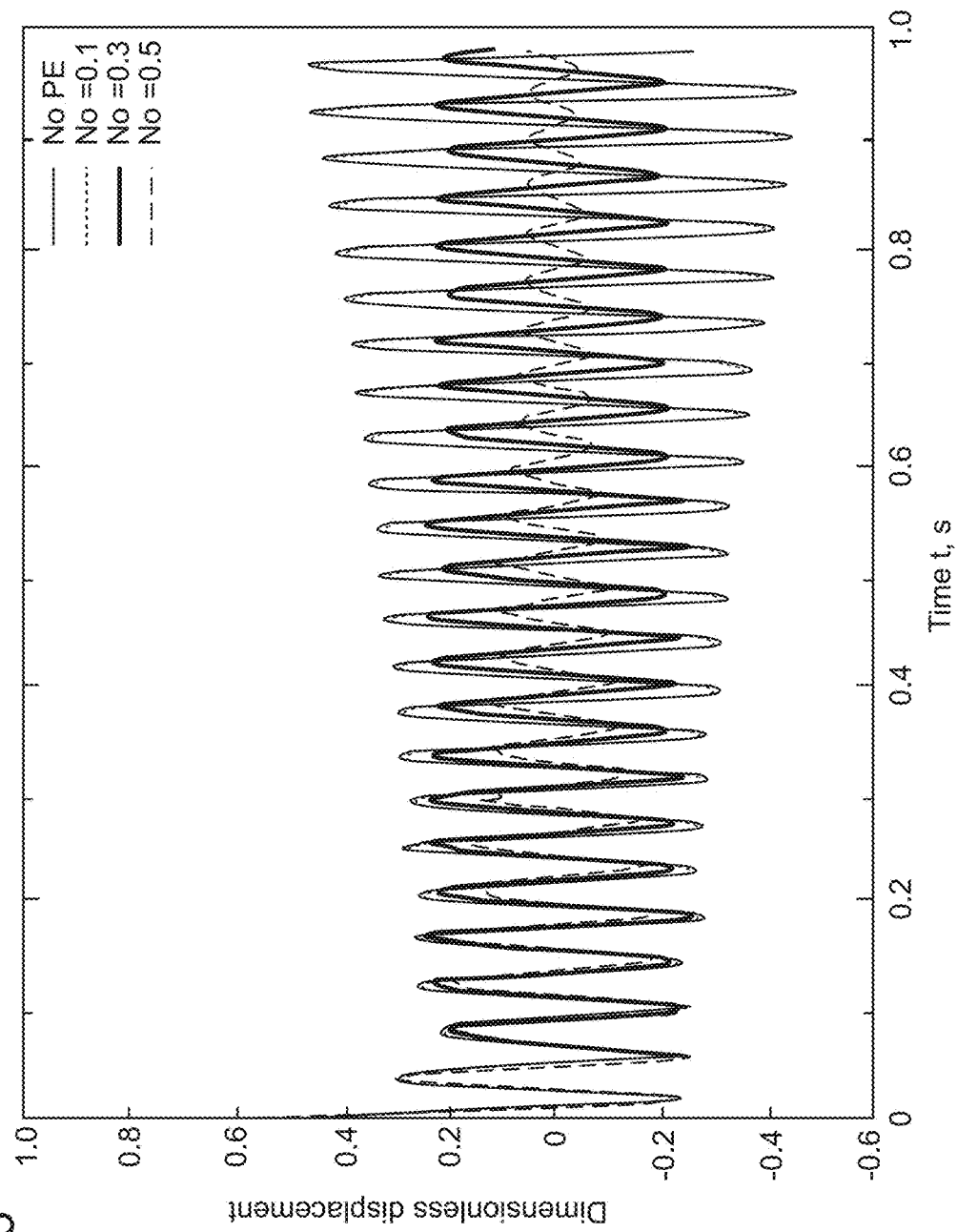

FIG. 22 depicts a plot showing instability thresholds of the system using the proposed adjustable bearings for the various amplitudes of (a) $\varepsilon_{YY}=0$, (b) $\varepsilon_{YY}=0.1$, (c) $\varepsilon_{YY}=0.2$, (d) $\varepsilon_{YY}=0.3$, (e) $\varepsilon_{YY}=0.4$, and (f) $\varepsilon_{YY}=0.5$; and FIG. 23 depicts a plot showing dimensionless time response of the driven end journal when a) parametric excitation (PE) is not introduced and b) PE is introduced with $\varepsilon_{YY}=0.1$, $\varepsilon_{YY}=0.3$, and $\varepsilon_{YY}=0.5$.

Figure 24:
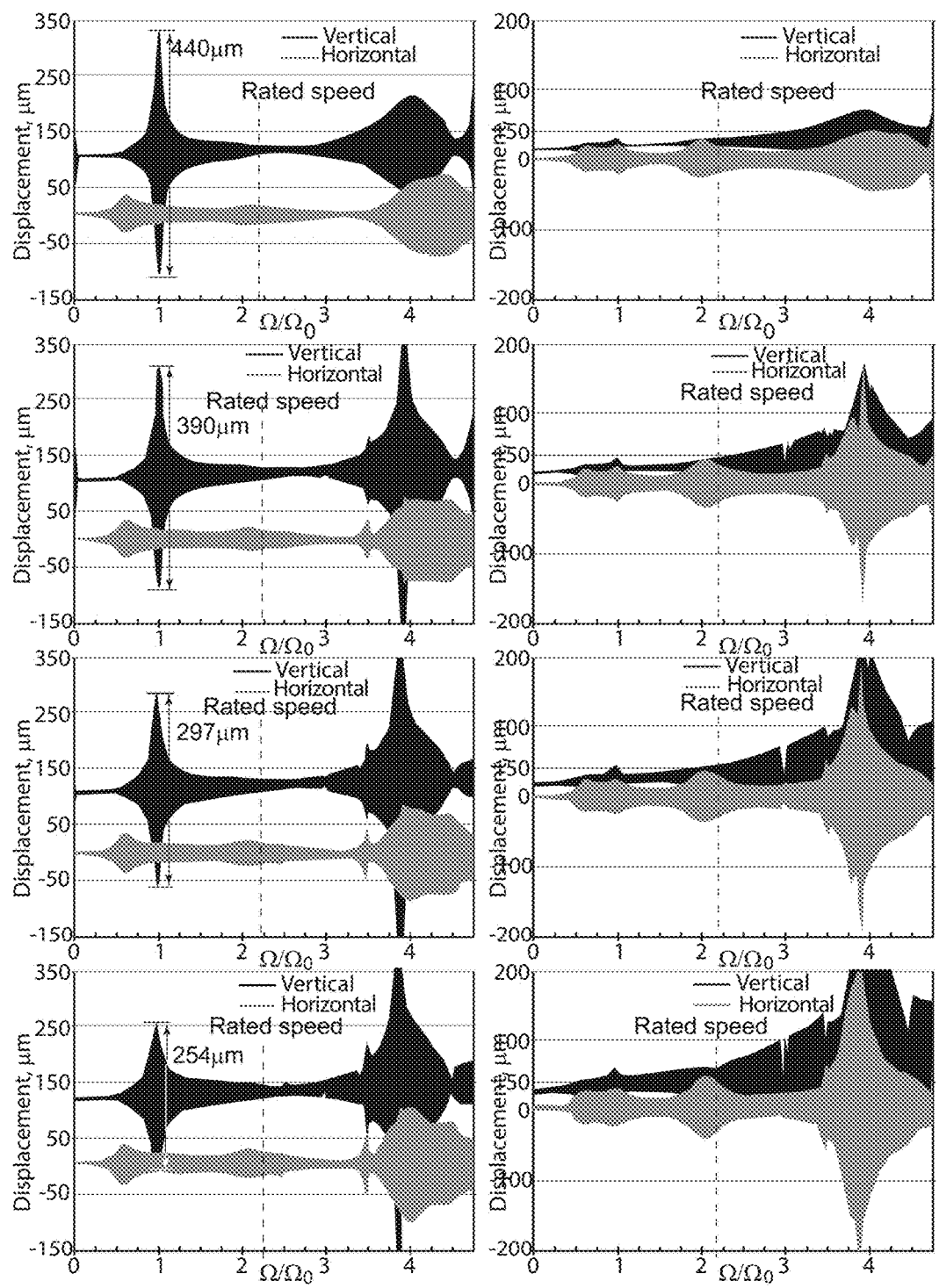

FIG. 24 depicts a plot showing unbalance amplitude as a function of rotating speed at a constant run-up of the system introducing parametric excitation with (a) $\varepsilon_{YY}=0$, (b) $\varepsilon_{YY}=0.4$, (c) $\varepsilon_{YY}=0.6$, (d) $\varepsilon_{YY}=0.8$. Left plots depict unbalance response evaluated at the bearing mid-span, and right plots depict unbalance response evaluated at the $1^{st}$ bearing location Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below presents improvements to bearings for use on turbines and related turbo-machinery. While shown in context of journal bearings, or mechanisms comprising a shaft rotating in a sleeve, these improvements may solve problems with vibration that occur variously in other types of elements that provide rotating support in mechanical mechanisms. In this regard, the embodiments below employ actuatable elements or "pads" to form carrying surfaces for the rotating shaft. An actuator also attaches to the pads. In use, the actuator can displaces the pads in a way that modulates properties of a thin film of lubricant that resides between the carrying surface and the rotating shaft. This feature can leverage modal interactions and parametric anti-resonance to suppress vibration on rotating shafts and, also, operate to adjust alignment of the shaft in real-time.

Embodiments

Figure 1:
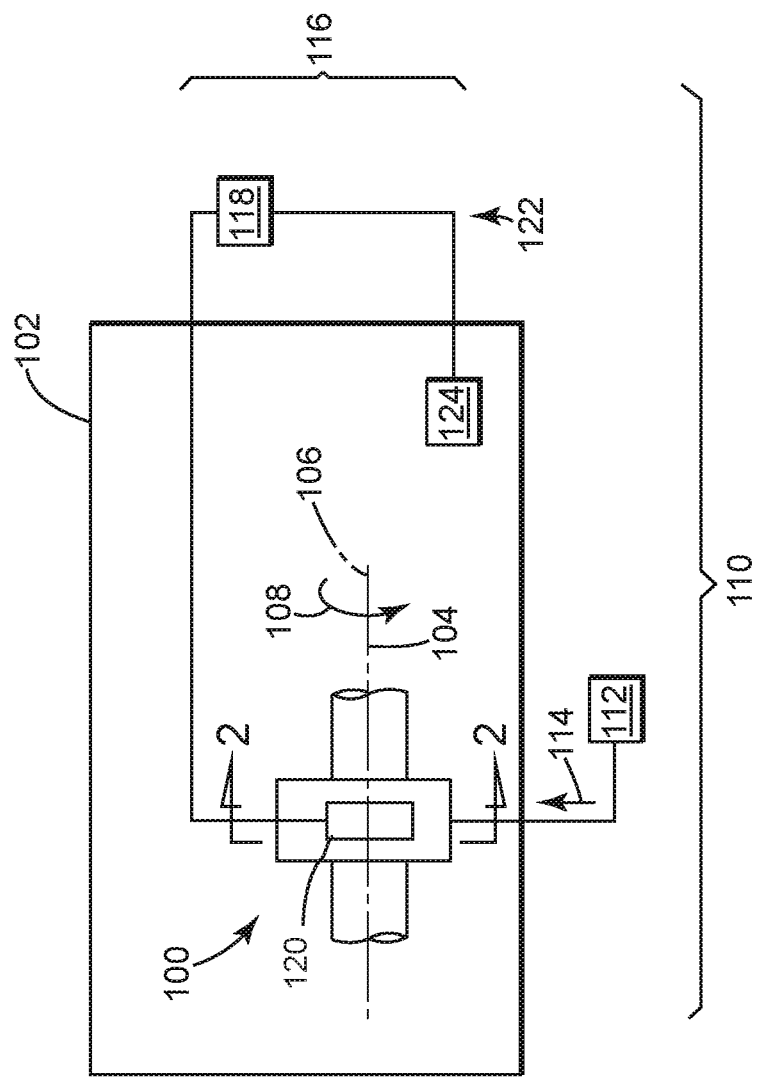
FIG. 1 depicts a schematic diagram of an exemplary embodiment of a bearing.

FIG. 1 provides a schematic diagram of one implementation of an exemplary embodiment of a bearing 100. This embodiment incorporates as part of a turbo-machine 102. Examples of the turbo-machine 102 can have a shaft 104 that extends through the bearing 100. This configuration permits the shaft 104 to rotate about an axis 106, as shown generally by the arrow enumerated with the numeral 108. The turbo-machine 102 may be configured to introduce fluid (e.g., steam) to the shaft 104 to cause rotation 108. As also shown in FIG. 1, the turbo-machine 102 may couple with a system 110 that can facilitate various functions. The system 110 may include a fluid injection system 112 that delivers fluid 114 to the bearing 100. Examples of fluid 114 include lubricants that facilitate the rotation 108 of the shaft 104 relative to the bearing 100. The system 100 may also include a control system 116 having functions that can control vibration among others during operation. The control system 116 may include a controller 118 and a suppression mechanism 120 found on the bearing 100. The control system 116 may also include a feedback mechanism 122 with sensors 124 to provide feedback to the controller 118 about operating conditions on the turbo-machine 102. In one implementation, the controller 118 uses feedback from the sensors 124 to operate the suppression mechanism 120 according to certain operating parameters (e.g., amplitude, frequency, etc.). As noted herein, values for these operation parameters may correspond with operating conditions that prevail as the shaft 104 rotates in the turbo-machine 102.

Broadly, the bearing 100 can be configured to actively damp vibration of the shaft 104 in response to these operating conditions. These configurations may apply principles of parametric excitation leading to parametric anti-resonance and/or modal interaction by way of manipulating properties of a thin film of the fluid 114.

Figure 2:
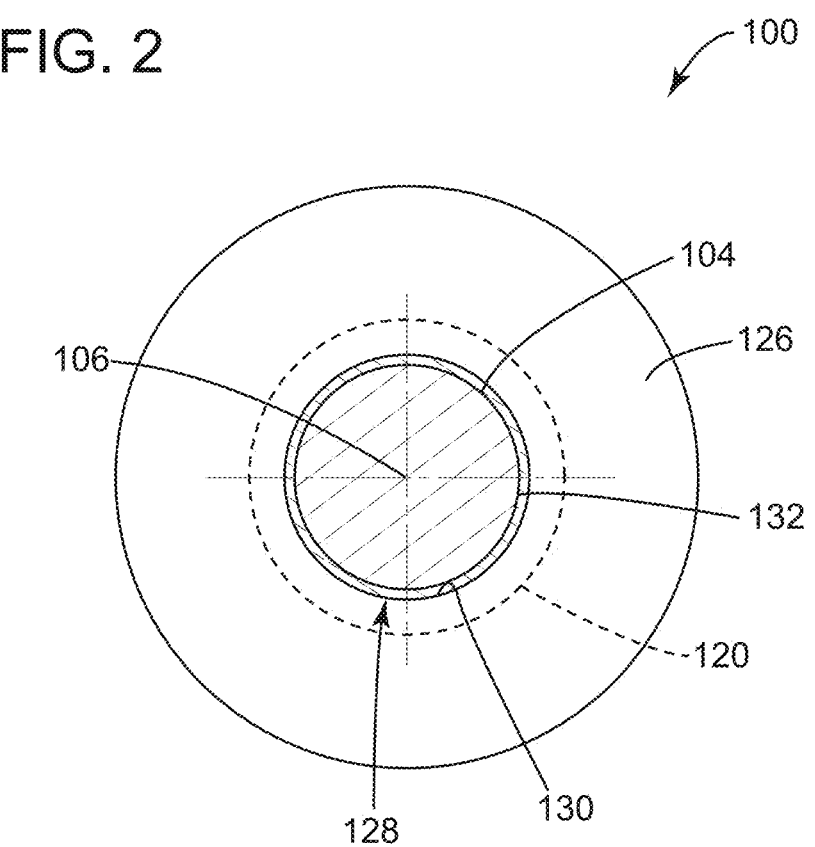
FIG. 2 depicts a detail, elevation view of the cross-section of the bearing of FIG. 1.

FIG. 2 illustrates a detail, elevation view of the cross-section of the bearing 100 taken at line 2-2 of FIG. 1 to further elaborate on the discussion. In one implementation, the bearing 100 may include a casing 126 forming an aperture 128. Examples of the aperture 128 can form a bore (or like geometry) with an interior wall 130 that circumscribes the axis 106. The bore can extend to open ends on either side of the casing 126. This feature allows the shaft 104 to insert through the casing 126. Fluid 114 may form a thin film 132 in the space between the interior wall 130 and the outer surface of the shaft 104. In one implementation, the suppression mechanism 120 may be configured to form at least part of the interior wall 124 of the bore. This configuration benefits operation because the controller 118 can actuate the suppression mechanism 120 to effectively modulate thickness of the thin film 132. Periodic variations in thickness, in turn, cause properties (e.g., stiffness, damping, etc.) of the thin film 132 that are favorable at least to attenuate or damp vibration in the shaft 104.

Figure 3:
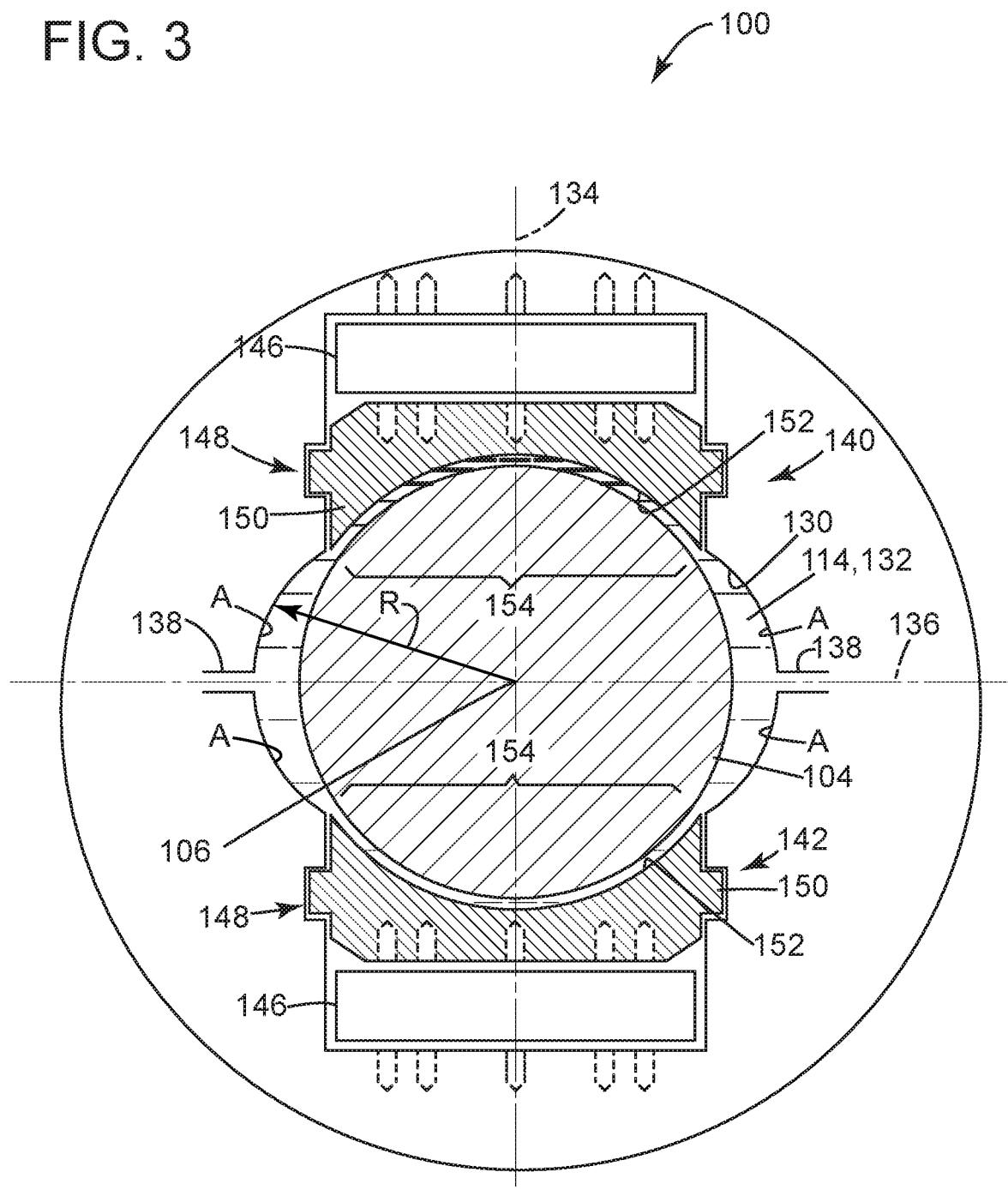
FIG. 3 depicts an elevation view of the cross-section of an example of the bearing of FIG. 1.
Figure 4:
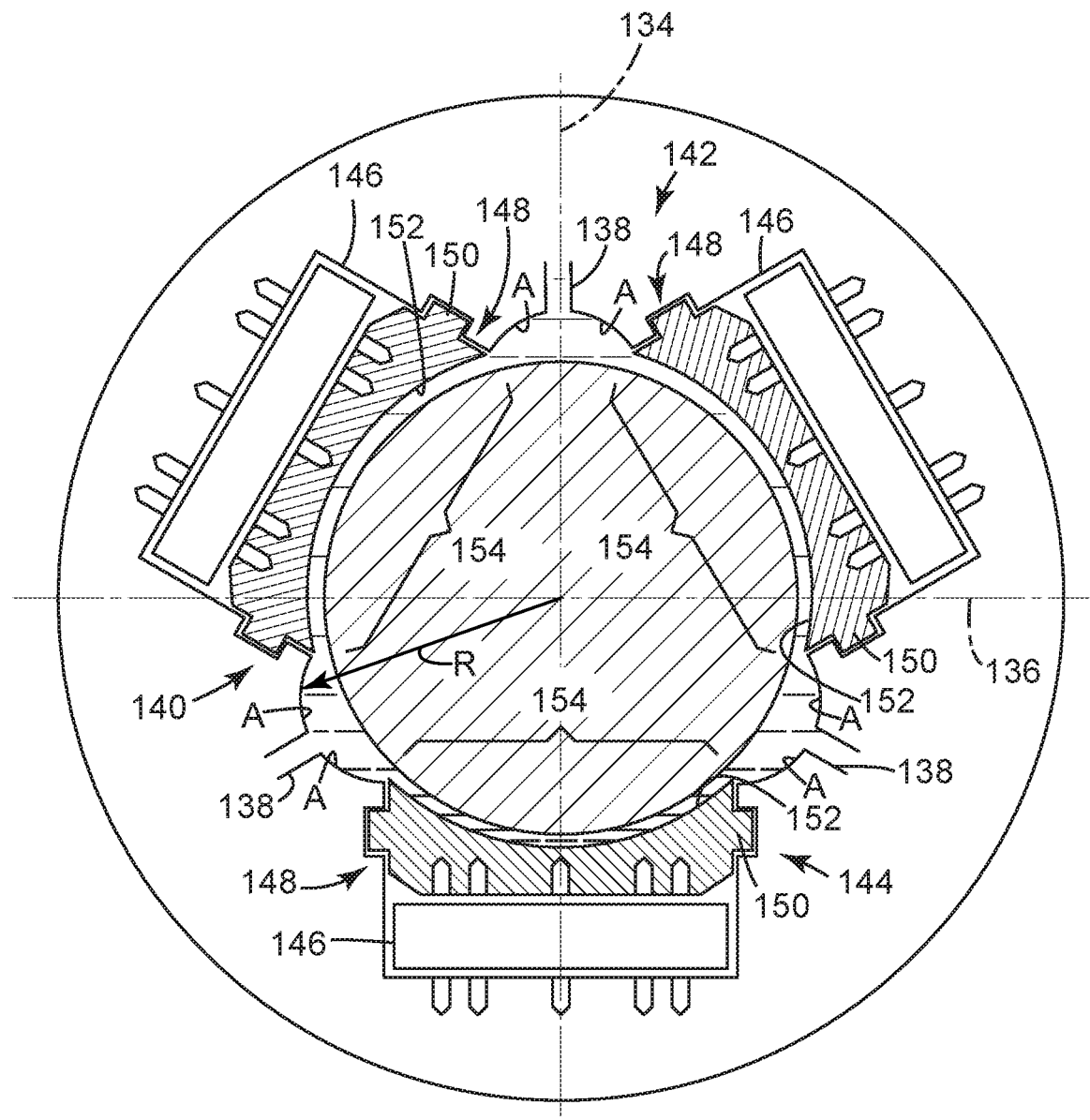
FIG. 4 depicts an elevation view of the cross-section of an example of the bearing of FIG. 1.

FIGS. 3 and 4 illustrate an elevation view of exemplary configurations of the suppression mechanism 120 for use as part of the bearing 100. Each of FIGS. 3 and 4 include a pair of reference axis (e.g., a second axis 134 and a third axis 136) that extend through the first axis 106 and perpendicular to one another. Ports 138 can provide access to the interior of the bore to allow fluid 114 to flow and fill the space between the shaft 104 and the interior wall 130. The ports 138 may reside in a portion A of the interior surface of the bore that has a variable radius R as measured from the center 106. Turning first to FIG. 3, the configuration may include one or more actuating members (e.g., a first actuating member 140 and a second actuating member 142). The actuating members 140, 142 may be disposed on opposite sides of the shaft 104, perhaps aligned on the second axis 134. In FIG. 4, the configuration of the suppression mechanism 120 can include a third actuating member 144. The members 140, 144 may be disposed on either side of the second axis 134, for example, as symmetric members of the suppression mechanism 120

Each of the actuating members 140, 142, 144 can be configured to modify properties of the thin film 132 to help attenuate vibration of the shaft 104. In one implementation, the actuating members 140, 142, 144 may have an actuator 146 and a moveable element 148. The actuator 146 may embody mechatronic mechanisms, like piezoelectric translators (or transducers), servomechanisms, and like devices that can precise displace the moveable element 148 according to the operating parameters and resident loading of the shaft 104. This feature may be important to facilitate the modal interaction necessary to damp vibration in one frequency (e.g., $1^{st}$ mode) by transferring vibration energy to another frequency (e.g., $2^{nd}$ mode). The moveable element 148 may comprise a body 150 that interacts with the actuator 146. The body 150 can have a surface 152 (also, "carrying surface 152") that is inwardly facing toward the bore or the first axis 106. This location positions the carrying surface 152 proximate the thin film 132. In one implementation, the carrying surface 152 is configured to operate as a portion 154 of the interior wall 130. This configuration is useful to manipulate the thin film 132 to effectively dampen vibration of the shaft 106. For example, the actuator 144 can displace the moveable element 146 to relative to the first axis 106 at a frequency and an amplitude to obtain favorable variation of stiffness and damping coefficients for the thin film 132 of lubricant 114, so as to introduce parametric excitation into the system.

Figure 5:
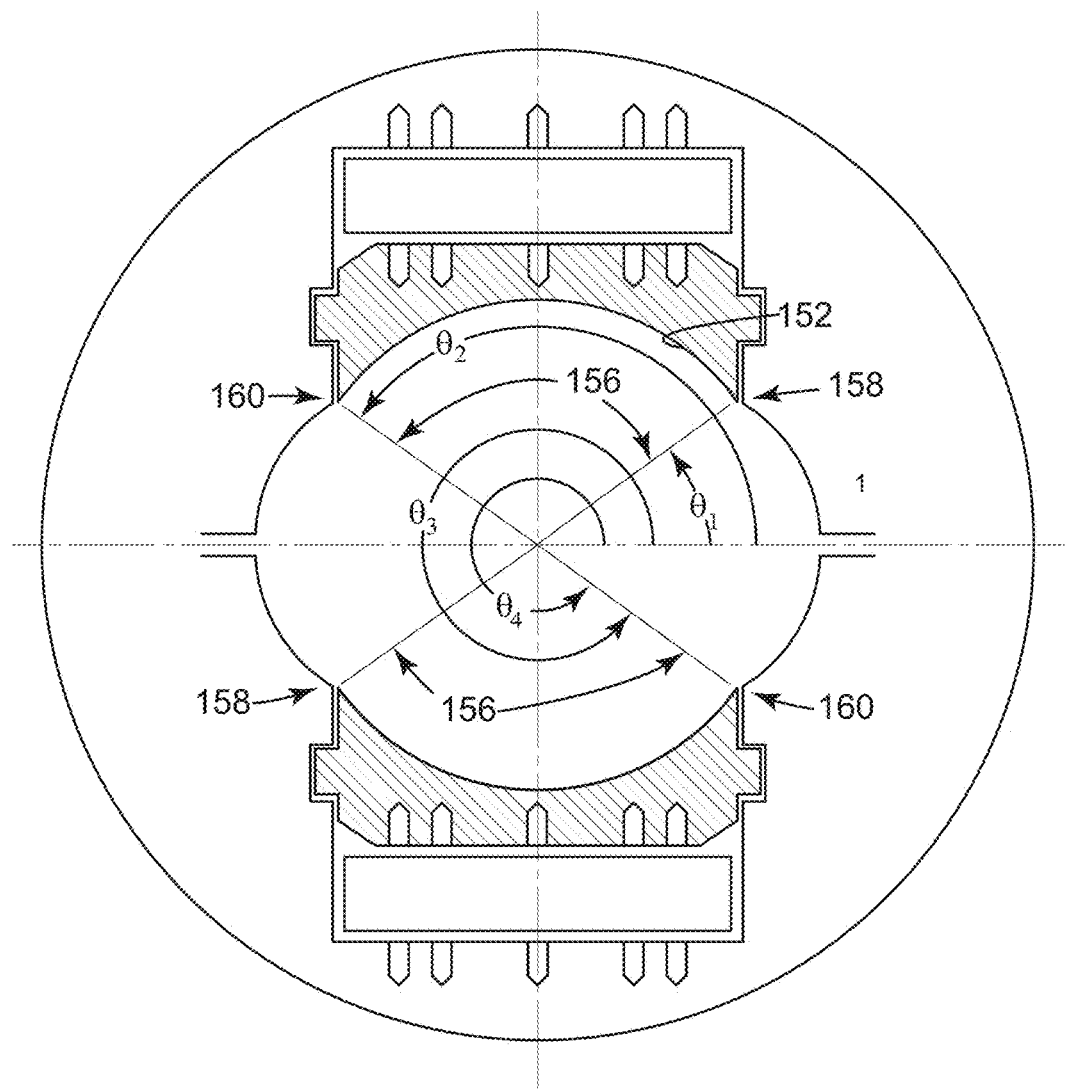
FIG. 5 depicts the elevation view of FIG. 3 with parts removed for clarity.
Figure 6:
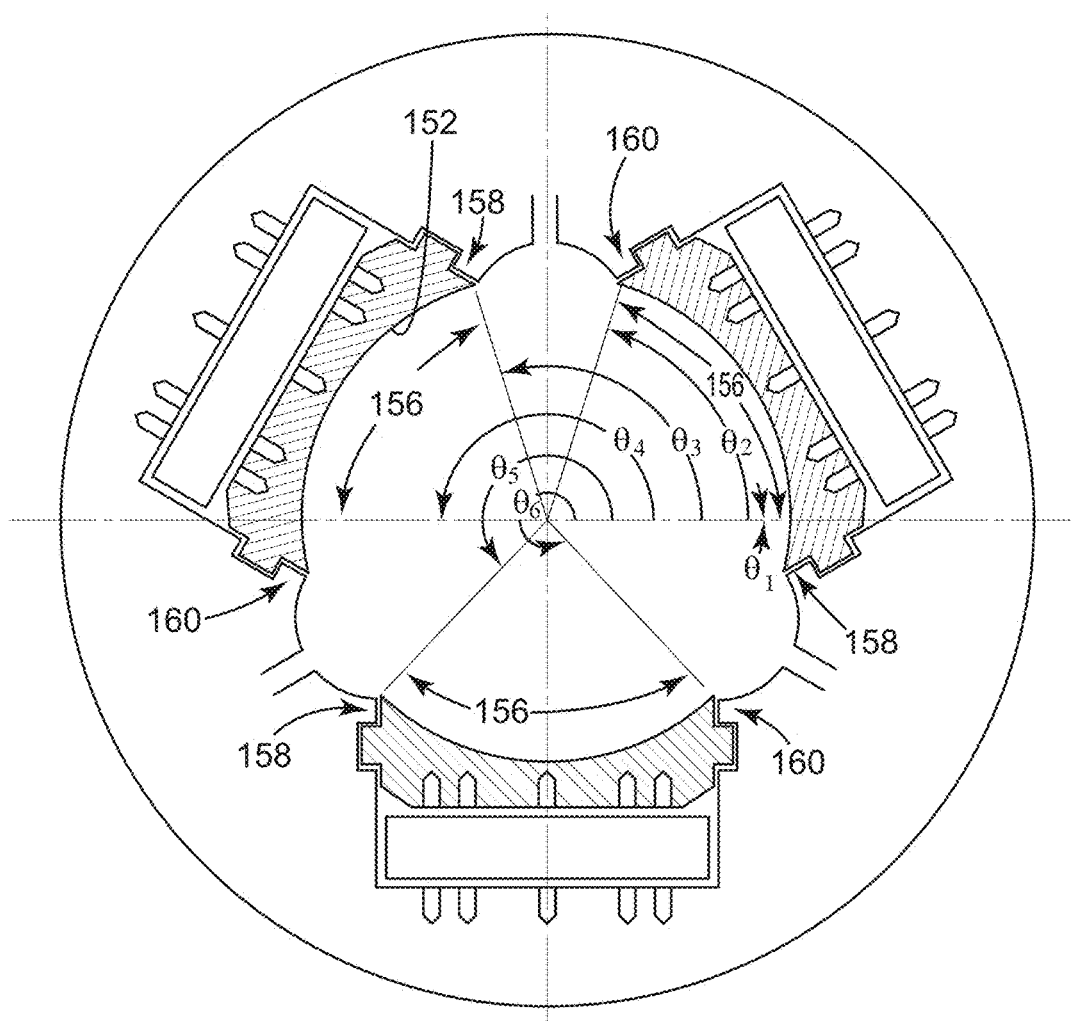
FIG. 6 depicts the elevation view of FIG. 4 with parts removed for clarity.

FIGS. 5 and 6 illustrate the configurations of FIGS. 3 and 4, respectively. Some parts are removed, however, for purposes of clarity. Generally, the geometry of the carrying surface 152 may form an arc 156 or, generally, is arcuate or otherwise curved to assimilate with the curvature of the shaft 104 or bore. The arc 156 may terminate at a pair of ends (e.g., a first end 158 and a second end 160). The location of the ends 158, 160 may be defined by an angle θ, which is noted for the actuating members 136, 138 as angles $\theta_1$, $\theta_2$, $\theta_3$, $\theta_4$, respectively. In one implementation, the angle θ can encompass values so that the arc 148 of the carrying surface 144 is the same on each of the actuating members 136, 138. The arc 148 of the third actuating member 156 can have ends 150, 152 defined by angles $\theta_5$ and $\theta_6$. The angles can be measured relative to one of the second axis 134 or a third axis 156, which itself passes through the first axis 106 and is perpendicular to the second axis 134.

Table 1 below provides exemplary values for the angle θ for the diagram of FIG. 5.

TABLE 1

| Angle θ | Exemplary Value |
| --- | --- |
| $\theta_1$ | 60° |
| $\theta_2$ | 120° |
| $\theta_3$ | 220° |
| $\theta_4$ | 280° |

Table 2 below provides exemplary values for the angle θ for the diagram of FIG. 6.

TABLE 2

| Angle θ | Exemplary Value |
| --- | --- |
| $\theta_1$ | 0° |
| $\theta_2$ | 60° |
| $\theta_3$ | 120° |
| $\theta_4$ | 180° |
| $\theta_5$ | 220° |
| $\theta_6$ | 320° |

Figure 7:
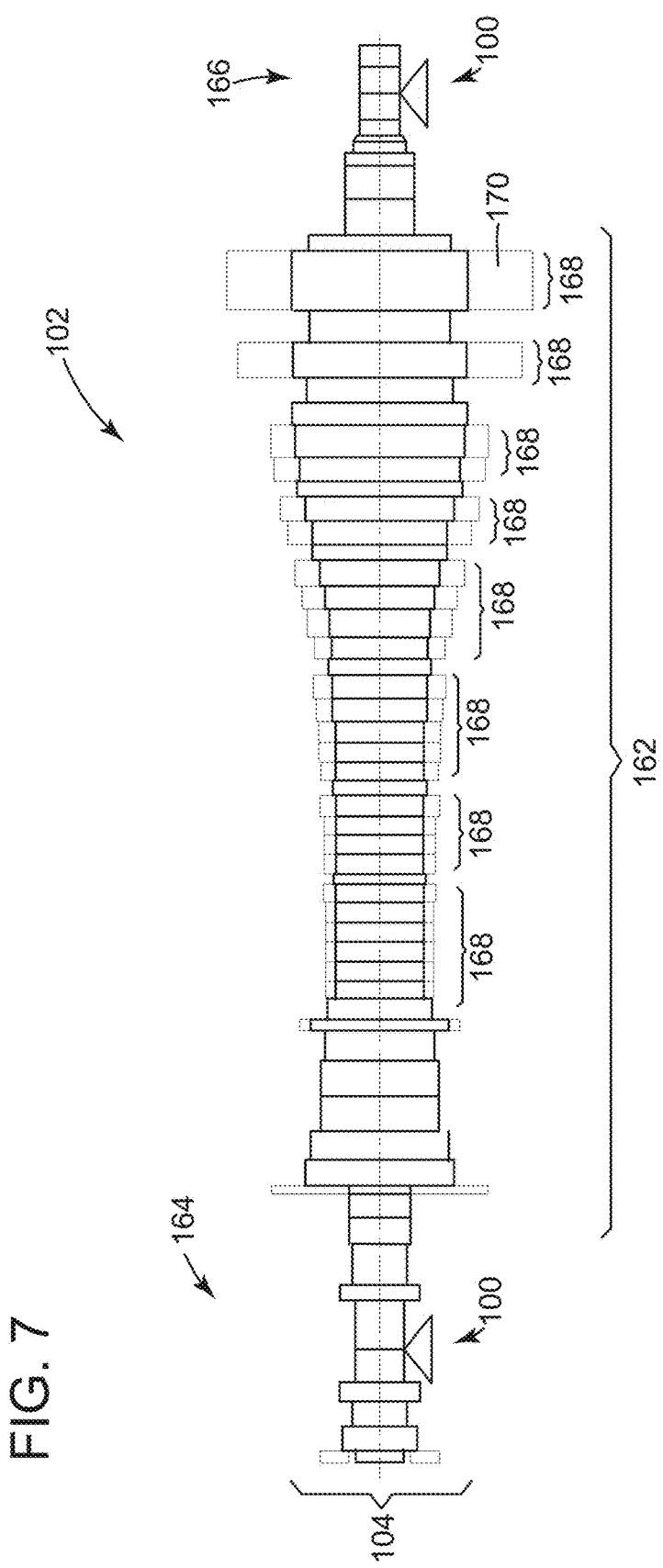
FIG. 7 depicts a schematic diagram of an exemplary implementation of the bearings of FIG. 1.

FIG. 7 illustrates a schematic diagram of an elevation view of an example of the turbo-machine 102. The shaft 104 operates as a rotor 162 with rotor ends (e.g., a first rotor end 164 and a second rotor end 166), one each supported by the bearing 100. The rotor 162 can incorporate a number of stages 168, each of which can have blades (identified generally by numeral 170) disposed circumferentially about the first axis 106. For reaction turbines, the blades 170 may have geometry that forms nozzles (e.g., convergent nozzles). This geometry makes use of reactionary forces that develop as steam accelerates through the nozzles to rotate the rotor 162 to generate power.

Figure 8:
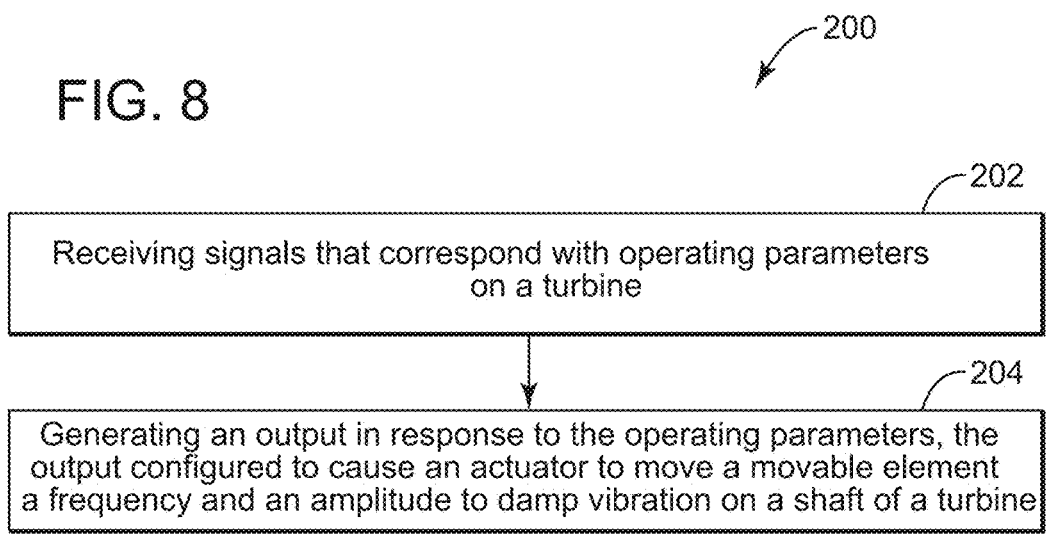
FIG. 8 depicts a flow diagram of an exemplary embodiment of a method of operating a turbine.

FIG. 8 illustrates a flow diagram for an exemplary embodiment of a method 200 for suppressing vibration on a turbine. The method 200 includes, at stage 202, receiving signals that correspond with operating parameters on a turbine. The method 200 also includes, at stage 204, generating an output in response to the operating parameters, the output configured to cause an actuator to move a moveable element at certain amplitude and frequency that damps vibration on a shaft of the turbine.

In light of the foregoing, devices like the bearing 100 may require service and maintenance to attend to its parts. Over time, parts may experience wear and, possibly, damage that can frustrate operation of the bearing 100. A technician may need to extract these parts, either in whole or in pieces, to remove existing parts in favor of one or more replacement parts. The replacement parts may originate from an OEM or alternative aftermarket dealer and/or distributor. Examples of the replacement parts may be newly constructed using any of the conventional manufacturing and machining techniques (including additive manufacturing). For certain techniques, a model file that comprises one or more instructions of executable code (on a storage medium and/or downloadable and/or executable) may be used to define the features of the replacement part. These instructions may cause a machine (e.g., a lathe, milling machine, 3-D printing machine) to perform certain functions to result in parts for use in the bearing 100.

This disclosure contemplates that one or more of the replacement parts for the bearing 100 may be formed by existing parts. For example, the actuating members 140, 142, 144 may lend themselves to refurbishing and like processes to prepare the existing parts into condition and/or to meet specifications for use as the replacement part in the structure. Refurbishing may utilize additive and subtractive manufacturing processes like buffing, bead-blasting, machining, and like practices that are useful to build-up and/or remove material from the part, as desired. Exemplary additive manufacturing processes may include 3-D printing with polymers, laser metal sintering, as well as after-developed technology.

The replacement parts may be assembled into the bearing 100 as a wholly-constructed assembly. In other implementations, the replacement parts may embody individual parts (e.g., the casing 120, the actuating members 140, 142, 144, etc.), as well as combinations and compilations thereof, possibly in the form of one or more sub-assemblies.

Figure 9:
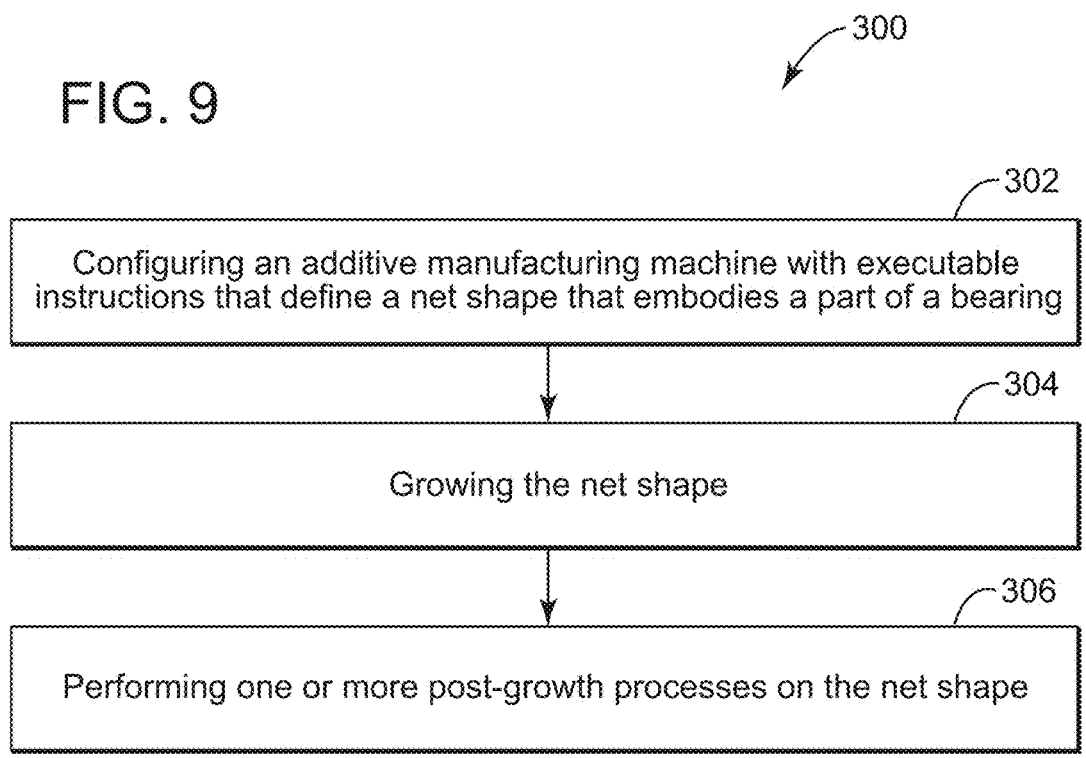
FIG. 9 depicts a flow diagram of a process for manufacturing one or more parts of the bearing of FIG. 1.

FIG. 9 illustrates an exemplary process 300 to manufacture an example of these individual parts. The exemplary process may leverage additive manufacturing techniques, alone or in combination with one or more other types of subtractive manufacturing techniques. As shown in FIG. 9, the process 300 can include, at stage 302, configuring an additive manufacturing machine with executable instructions that define a net shape. The net shape can embody the part, in whole or in part, including, for example, configurations of the casing 120 (FIGS. 2, 3, and 4) described hereinabove. The process 300 can also include, at stage 304, growing the net shape and, where necessary, at stage 306, performing one or more post-growth processes on the net shape.

Implementations of the process 300 and related assembly techniques can render embodiments of the bearing 100. These implementations may result in, for example, a bearing comprising a casing made by the process of configuring an additive manufacturing machine with executable instructions that define a net shape, growing the net shape, and performing one or more post-growth processes on the net shape. Such implementation that result in the bearing are also contemplated wherein the one or more post-growth processes comprises one or more of heat treating the net shape, deburring the net shape, machining the net shape, applying a surface finish to one or more surfaces of the net shape, removing material of the net shape using abrasives, and inspecting the net shape to accumulate dimensional data and comparing the dimensional data to a default value.

Theory and Practice

This disclosure contemplates structure for adjustable partial-arc bearings that can damp or suppress vibration in turbo-machinery. The structure may employ multiple movable elements 148 or "pads" that reside circumferentially in the bearing 100 and about the shaft 104. Actuators 146 may attach to the pads 148. The actuators 146 can cause the pads 148 to translate in accordance with a pre-determined pattern, for example, harmonic (sinusoidal) displacement with certain amplitude and frequency.

Figure 11:
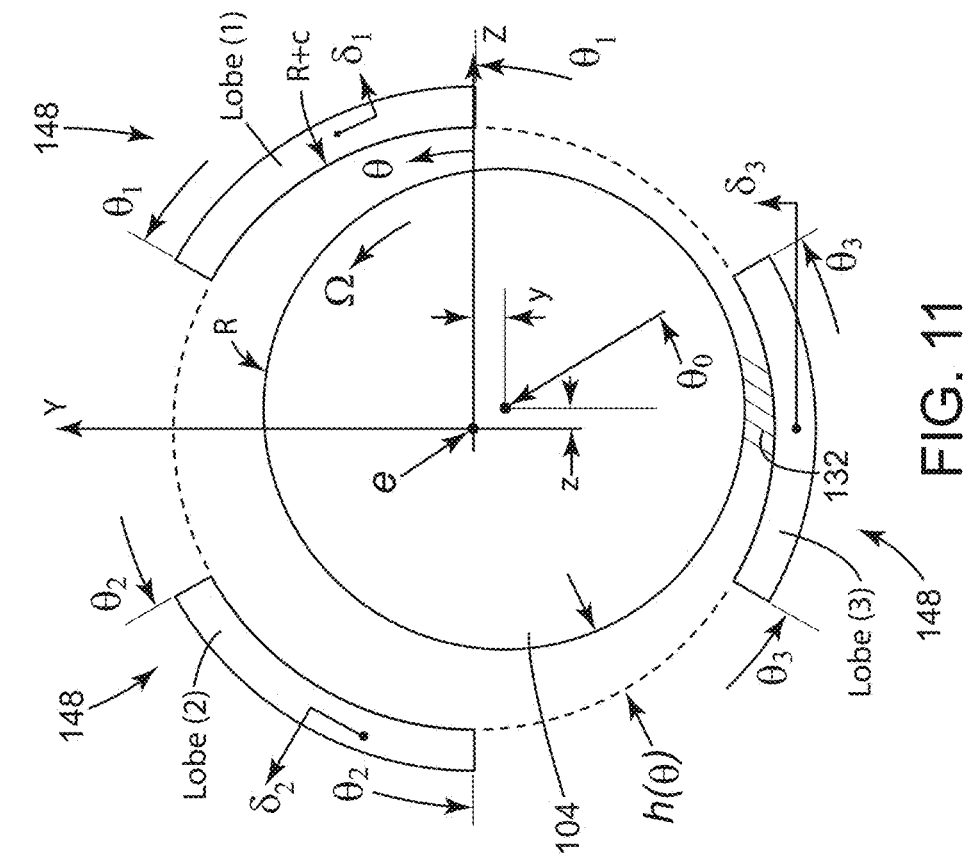
FIG. 11 depicts a schematic diagram of the bearing FIG. 3 for the 3-pad design.
Figure 10:
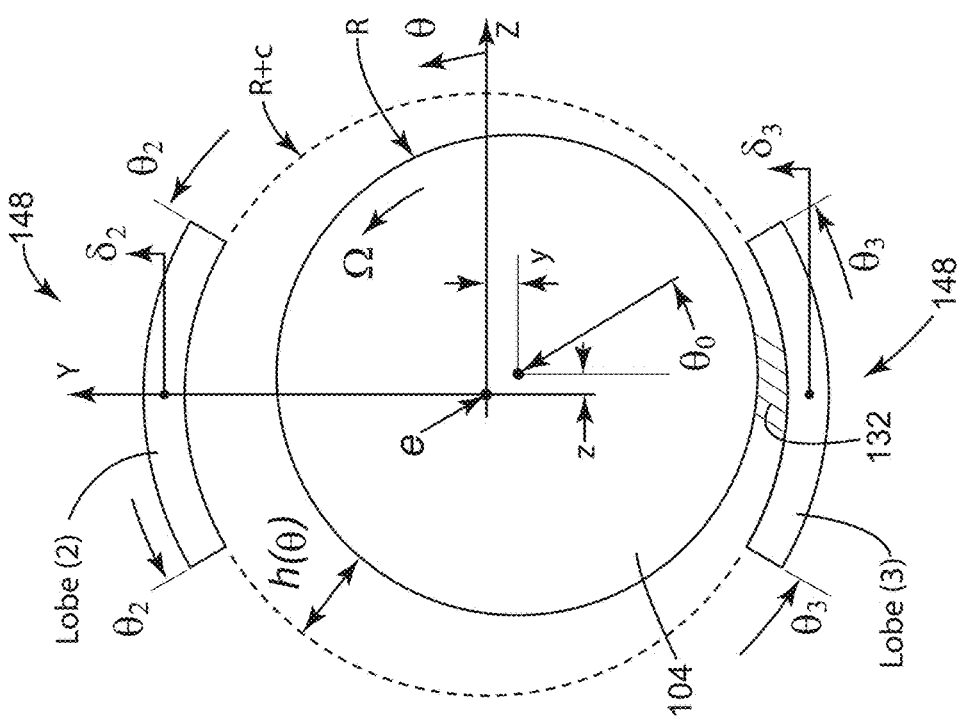
FIG. 10 depicts a schematic diagram of the bearing of FIG. 2 for the 2 pad-design.

FIGS. 10 and 11 depict a schematic diagram of geometry for the moveable elements or "pads" 148 and other parts of the bearing 100. FIG. 10 shows geometry for the bearing 100 with two pads 148 that are disposed diametrically opposite from one another and, effectively, on opposite sides of the shaft 104. The pads 148 may form arcs of equal arc length. In FIG. 11, the geometry for the bearing 100 with three pads 148, each being annularly offset around the shaft 104 from adjacent pads 148. This 3-pad design may use two pads of equal arc length and one pad with the arc length larger than the other two. The shaft 104 has an annular or cylindrical cross-section with a center axis C and radius $R_1$ having a value as measured from the center axis C to the outer surface of the shaft 104. The carrying surface 152 for the pads 148 are spaced apart from the axis 106 by a radius $R_2$ with a value of $R_1+c$. Further, the thin film 132 may have a thickness h that can be defined with respect to the circumferential coordinate $\theta$ as set forth in Equation (1) below, $$h_0(\theta) = c - z\cos(\theta)y\sin(\theta),$$ Equation (1)

where the function $h_0(\theta)$ can be theoretically defined about the entire circumference of the bearing 100, but practically is applied within $\theta_i < \theta < \theta_{i*\ at\ the\ i}{}^{th}$ pad 148 disposed about the circumference of the bearing 100.

Tables 3 and 4 below defines exemplary values for geometry shown in FIGS. 10 and 11.

TABLE 3

2-Pad Design

| Definition | Pad 1 | Pad 2 | Pad 3 |
|---|---|---|---|
| Starting angle | — | $\theta_2 = 60°$ | $\theta_2 = 240°$ |
| Ending angle | — | $\theta_2* = 120°$ | $\theta_3* = 300°$ |
| Located at | — | $\theta_{L,2} = 90°$ | $\theta_{L,3} = 270°$ |
| Of arc length | — | $a_2 = 60°$ | $a_3 = 60°$ |
| In phase of | — | $\varphi_2 = 0$ rad | $\varphi_3 = \pi$ rad |

TABLE 4

3-Pad Design

| Definition | Pad 1 | Pad 2 | Pad 3 |
|---|---|---|---|
| Starting angle | $\theta_1 = 0°$ | $\theta_2 = 120°$ | $\theta_2 = 220°$ |
| Ending angle | $\theta_1* = 60°$ | $\theta_2* = 180°$ | $\theta_3* = 320°$ |
| Located at | $\theta_{L,1} = 30°$ | $\theta_{L,2} = 150°$ | $\theta_{L,3} = 270°$ |
| Of arc length | $a_1 = 60°$ | $a_2 = 60°$ | $a_3 = 100°$ |
| In phase of | $\varphi_1 = \pi/6$ rad | $\varphi_2 = 5\pi/6$ rad | $\varphi_3 = 9\pi/6$ rad |

In one implementation, the $i^{th}$ pad 148 in both the 2-pad and 3-pad designs can be enabled for a variable in time displacement $\delta_i$ through the radial direction of its middle, defined as $\theta_{L,i}$, within an amplitude $\delta_0$, frequency $\Omega_{ex}$, and in phase $\varphi_i$ as set forth in Equation (2) below, $$\delta_i = \delta_0 \cos(\Omega_{ex}t - \varphi_i)$$ Equation (2)

where values of $\varphi_i$ may correspond with Table 3 above. The additional fluid film thickness $d_i(\theta)$ at the $i^{th}$ pad that is introduced due to the $i^{th}$ pad displacement and is added to the $h_0(\theta)$, can be defined in accordance with Equation (3) below, $$d_i(\theta) = \delta_i \cos(\theta - \theta_{L,i}) = \delta_0 \sin(\Omega_{ex}t - \varphi_i)\cos(\theta - \theta_{L,i})$$ Equation (3)

The resulting fluid film thickness function at the $i^{th}$ pad 148 is defined as set forth in Equation (4) below, $$h_i(\theta) = h_0(\theta) + d_i(\theta),$$ Equation (4)

so that the rate of change of the additional fluid film thickness and resulting fluid thickness due to the displacement of each moving pad 148 can be defined in accordance with Equations (5) and (6), respectively below, $$\dot{d}_i = \Omega_{ex}\delta_0 \cos(\Omega_{ex}t - \varphi_i)\cos(\theta - \theta_{L,i})$$ Equation (5)

$$\dot{h}_i = \dot{z}\cos(\theta) - \dot{y}\sin(\theta) + \Omega_{ex}\delta_0\cos(\Omega_{ex}t - \varphi_i)\cos(\theta - \theta_{L,i}),$$ Equation (6)

The partial derivative of the resulting fluid film function $h_i$ with respect to $\theta$ can then be evaluated.

In operation, the shaft 104 may displace in y and z within the radial clearance of the bearing 100. The displacement may result in an absolute eccentricity e and a relative eccentricity $\varepsilon$.

The absolute eccentricity e can be defined in accordance with Equation (7) below, $$e = \sqrt{z^2 + y^2},$$ Equation (7)

The relative eccentricity $\varepsilon$ can be defined in accordance with Equation (8) below, $$\varepsilon = \frac{e}{c},$$ Equation (8)

at a range of, for example, $0.15 < \varepsilon < 0.75$. In one implementation, the volume of lubricant flowing in each pad is assumed under the following assumptions (1) the lubricant flow is laminar, (2) the gravity and inertia forces acting on the lubricant can be ignored compared with the viscous force, (3) compressibility of the lubricant is negligible, (4) the lubricant is Newtonian and the coefficient of viscosity is constant, (5) lubricant pressure does not change across the film, (6) the rate of change of the velocity of the lubricant in the circumferential direction and the axial direction of the bearing is negligible compared with the rate of change in the radial direction, (7) there is no slip between the fluid and the solid surface.

The lubricant pressure distribution at the $P_i(x, \theta)$ may satisfy Reynolds Equation (Right Hand Side "RHS") for bearing 100 having a finite length as defined in accordance with Equation (9) below, $$\frac{1}{\mu R^2}\frac{\partial}{\partial \theta}\left(h_i^3 \frac{\partial P_i}{\partial \theta}\right) + \frac{1}{\mu}\frac{\partial}{\partial x}\left(h_i^3 \frac{\partial P_i}{\partial x}\right) = 6\Omega\frac{\partial h}{\partial \theta} + 12\dot{h}_i,$$ Equation (9)

where the right hand side terms of the RHS equation can be defined as set forth in Equation (10) below, $$RHS = 6\Omega \frac{\partial h_i}{\partial \theta} + 12\dot{h}_i,\qquad \text{Equation (10)}$$

In turn, using the definitions above, RHS can be further defined as set forth in Equations (11) and (12) below, RHS=$6\Omega(\dot{z}$ sin($\theta$)$-\dot{y}$ cos($\theta$)$-\delta_0$ sin($\Omega_{ex}t-\varphi_i$)sin ($\theta-\theta_{L,i}$))+12($-\dot{z}$ cos($\theta$)$-\dot{y}$ sin($\theta$)+$\delta_0\Omega_{ex}$ cos ($\Omega_{ex}t-\varphi_i$)cos($\theta-\theta_{L,i}$)), Equation (11)

RHS=$-6(2\dot{z}+\Omega y)$cos($\theta$)$-6(2\dot{y}-\Omega z)$sin($\theta$)$-6\delta_0(\Omega$ sin ($\Omega_{ex}t-\varphi_i$)sin($\theta-\theta_{L,i}$)$-2\Omega ex(\Omega ext-\varphi i)$cos ($\theta-\theta L,i$)), Equation (12)

The pressure distribution $P_i(x, \theta)$ at the $i^{th}$ pad 148 can be evaluated by solving Equation X using the finite difference method (FDM) at a given discrete time, $t_n=n$ $\delta t$, and for a given set of values of operating parameters $\Omega$, y, z, ẏ, ż. Lubricant pressure can be evaluated at a finite different grid of 10×30 intervals at the axial direction and the circumferential direction, respectively. Assumptions for the pressure distribution may consider that the pressure is zero at the ends of each pad 148, for example, where lubricant may feed into the bearing 100.

The pressure distribution at the divergent area of each pad 148 can be evaluated but it is neglected (assumed zero or ambient) at the evaluation of the fluid film impedance force. Thus, only the positive pressure is integrated in the following equations to obtain the bearing impedance forces. With one axial interval of $\delta_x$, equal at all pads 148 to $\delta_x=L/10$, and three different circumferential intervals defined at the $i^{th}$ pad 148 as Equation (13), $$\delta\theta_i = \frac{(\theta_i^* - \theta_i)}{30},\qquad \text{Equation (13)}$$

The impedance force of the 2-pad design (FIG. X) at the horizontal direction and the vertical direction can be given as in, respectively, Equations (14) and (15) below, $F_Z=-\Sigma_{i=1}^{30-1}\Sigma_{j=1}^{10-1}(P_2(x_j,\theta_{2,i})R \cos(\theta_{2,i})\delta x\delta\theta_2)-\Sigma_{i=1}^{30-1}\Sigma_{j=1}^{10-1}(P_3(x_j,\theta_{2,i})R \cos(\theta_{3,i})\delta x\delta\theta_3),$ Equation (14)

$F_Y=-\Sigma_{i=1}^{30-1}\Sigma_{j=1}^{10-1}(P_2(x_j,\theta_{2,i})R \sin(\theta_{2,i})\delta x\delta\theta_2)-\Sigma_{i=1}^{30-1}\Sigma_{j=1}^{10-1}(P_3(x_j,\theta_{2,i})R \sin(\theta_{3,i})\delta x\delta\theta_3),$ Equation (15)

The impedance force of the 3-pad design (FIG. X) at the horizontal direction and the vertical direction can be given as in, respectively, Equations (16) and (17) below, $F_Z=-\Sigma_{i=1}^{30-1}\Sigma_{j=1}^{10-1}(P_1(x_j,\theta_{1,i})R \cos(\theta_{1,i})\delta x\delta\theta_2)-\Sigma_{i=1}^{30-1}\Sigma_{j=1}^{10-1}(P_2(x_j,\theta_{2,i})R \cos(\theta_{2,i})\delta x\delta\theta_2)-i=130-1j=110-1(P3xj,\theta 3,iR \cos(\theta 3,i)\delta x\delta\theta 3),$ Equation (16)

$F_Z=-\Sigma_{i=1}^{30-1}\Sigma_{j=1}^{10-1}(P_1(x_j,\theta_{1,i})R \sin(\theta_{1,i})\delta x\delta\theta_2)-\Sigma_{i=1}^{30-1}\Sigma_{j=1}^{10-1}(P_2(x_j,\theta_{2,i})R \sin(\theta_{2,i})\delta x\delta\theta_2)-i=130-1j=110-1(P3xj,\theta 3,iR \sin(\theta 3,i)\delta x\delta\theta 3),$ Equation (17)

where the angle at each point of the defined grid is defined at the $i^{th}$ pad 148 for both the 2-pad design and the 3-pad design as set forth in Equation (18) below, $\theta_{i,j}=\theta_i=i\cdot\delta\theta_i.$ Equation (18)

The rotor 104 can be located at a fixed equilibrium position (ẏ=ż=0), where the minimum fluid film thickness coincides with a circumferential location at which the value for the lubricant pressure is approximately zero. Some implementations may assume cavitation occurs for greater circumferential angles on the pads 148, so that the developed negative pressure is assumed to be zero at Equation 14-17 above. The angle at which no pressure is noticed is not used as a boundary condition for the evaluation of the pressure distribution, but the evaluation of the boundary conditions yields this value so as to assume pressure is approximately zero at the beginning and the end of the arc at the pads 148. This assumption for the boundary conditions may apply for dynamic cases (ẏ≠0, ż≠0) where the minimum fluid film thickness angle does not coincide with pressure at zero. Again, negative pressures may not be contemplated in the numerical integration in Equations 14-17 above.

The discussion now turns to evaluate the resulting stiffness and damping coefficients of the fluid film for the bearing 100 in each of the 2-pad design (FIG. 10) and the 3-pad design (FIG. 11). The Sommerfeld number may be defined in accordance with Equation (19) below, $$So = \frac{\mu R L \Omega \left(\frac{R}{c}\right)^2}{(\pi W)} \text{ (SI units)},\qquad \text{Equation (19)}$$

for geometric and physical parameters that correspond to use of the bearing 100 as bearings in small steam turbine and exemplified in Table 3 above. For a set of geometrical and physical parameters close to those found in Table 3, the equilibrium locus is evaluated for both 2-pad design and the 3-pad design for Sommerfeld number in a range of 0.05<So<0.5. In each case, rotating speed $\Omega$ may change as the operative variable.

In this regard, an algorithm may be used to implement the Newton-Raphson method so as to solve the system of equations that describe the equilibrium position of the shaft 104 and the two "unknowns"—the vertical displacement and horizontal displacement of the shaft 104 in y and z. An example of this system is set forth as Equation (20), $$\left\{\begin{matrix}y\\z\end{matrix}\right\}_{i+1} = \left\{\begin{matrix}y\\z\end{matrix}\right\}_i - J_i^{-1} \times \left\{\begin{matrix}f_1\\f_2\end{matrix}\right\}_i,\qquad \text{Equation (20)}$$

$$\text{where } J_i = \begin{bmatrix}\frac{\partial f_1}{\partial y} & \frac{\partial f_1}{\partial z}\\\frac{\partial f_2}{\partial y} & \frac{\partial f_2}{\partial z}\end{bmatrix},$$

$$\text{and } \left\{\begin{matrix}f_1\\f_2\end{matrix}\right\}_i = \left\{\begin{matrix}F_Y - W\\f_Z\end{matrix}\right\}_i,$$

where the method may assume static conditions (z=y=0) and external vertical load W and rotating speed $\Omega$ for the shaft 104. That is, for a given set of initial values identified in Equation (21) below, $$\{yz\}_0^T=\{-0.01c0.01x\}_0^T,\qquad \text{Equation (21)}$$

the Jacobian matrix $J_i$ may be evaluated and the system's equations obtain their initial values $\{f_1\ f_2\}_0^T$. After only some iterations (e.g., <5), the product $J_i \times \{f_1\ f_2\}_0^T$ may be very close to zero to achieve the solution. The partial derivatives presented in the Jacobian matrix $J_i$ may be evaluated numerically with a perturbation of the corresponding variable $10^{-9}$.

Figures 12, 13:
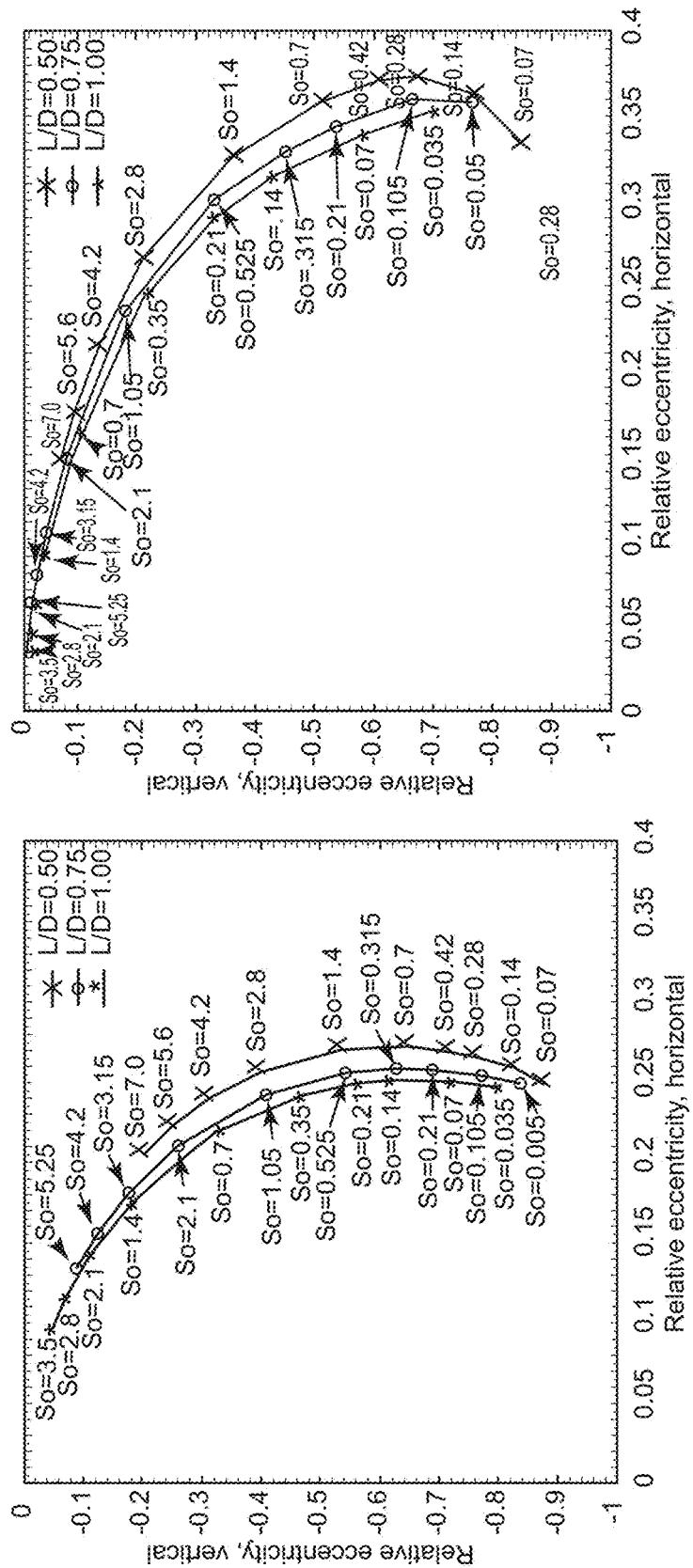
FIG. 12 depicts a plot showing equilibrium locus of 2-pad design for various values of Sommerfeld number (So)
FIG. 13 depicts a plot showing equilibrium locus of 3-pad design for various values of Sommerfeld number (So)

FIGS. 12 and 13 depict plots of the equilibrium locus that result from the process discussed herein. FIG. 12 shows a plot for the 2-pad design. FIG. 13 shows a plot for the 3-pad design. Each of the plots identifies variations in Sommerfeld number to correspond from low to high rotor eccentricity. Nominally, three cases are considered regarding geometry as L/D=0.5, L/D=0.75, and L/D=1.00. As shown, the equilibrium locus does not differ much among the three. But the equilibrium position is found at a considerably different location for the same Sommerfeld number among the three cases, especially for low eccentricities.

Figure 15:
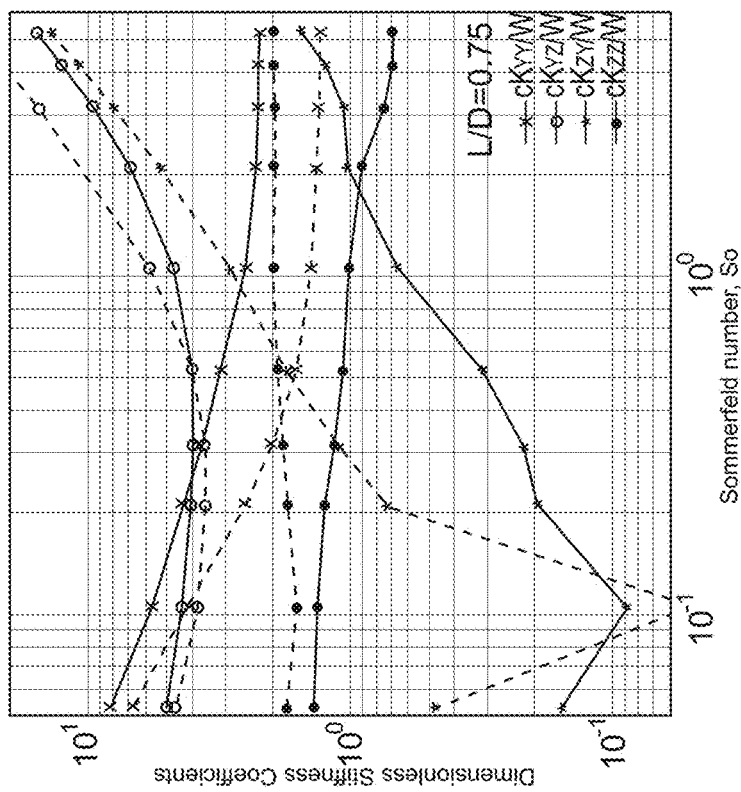
FIG. 15 depicts a plot showing stiffness coefficients of the 3-pad design as a function of Sommerfeld number (So) compared to plain cylindrical bearing.
Figure 14:
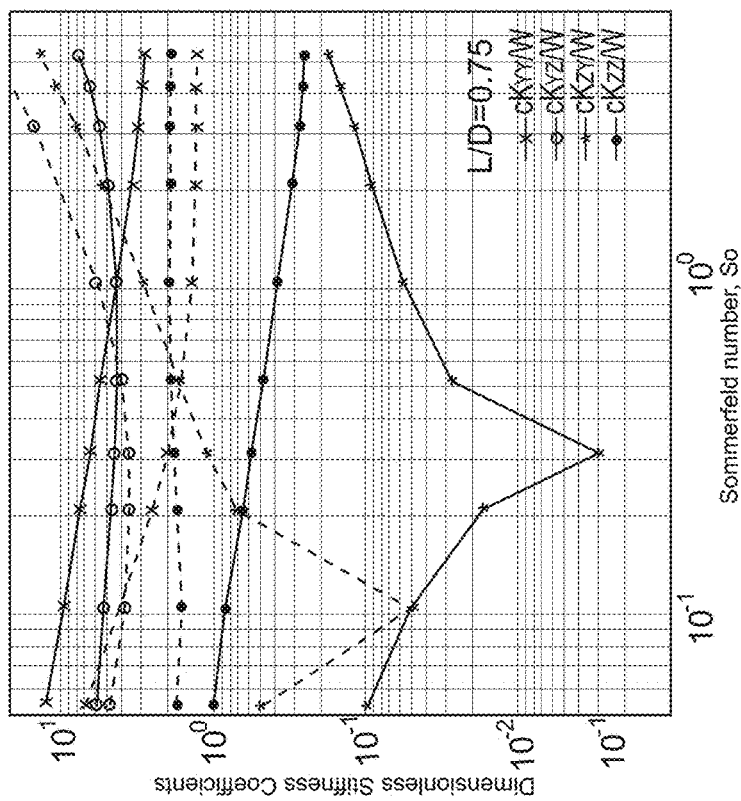
FIG. 14 depicts a plot showing stiffness coefficients of the 2-pad design as a function of Sommerfeld number (So) compared to plain cylindrical bearing.
Figures 16, 17, 18:
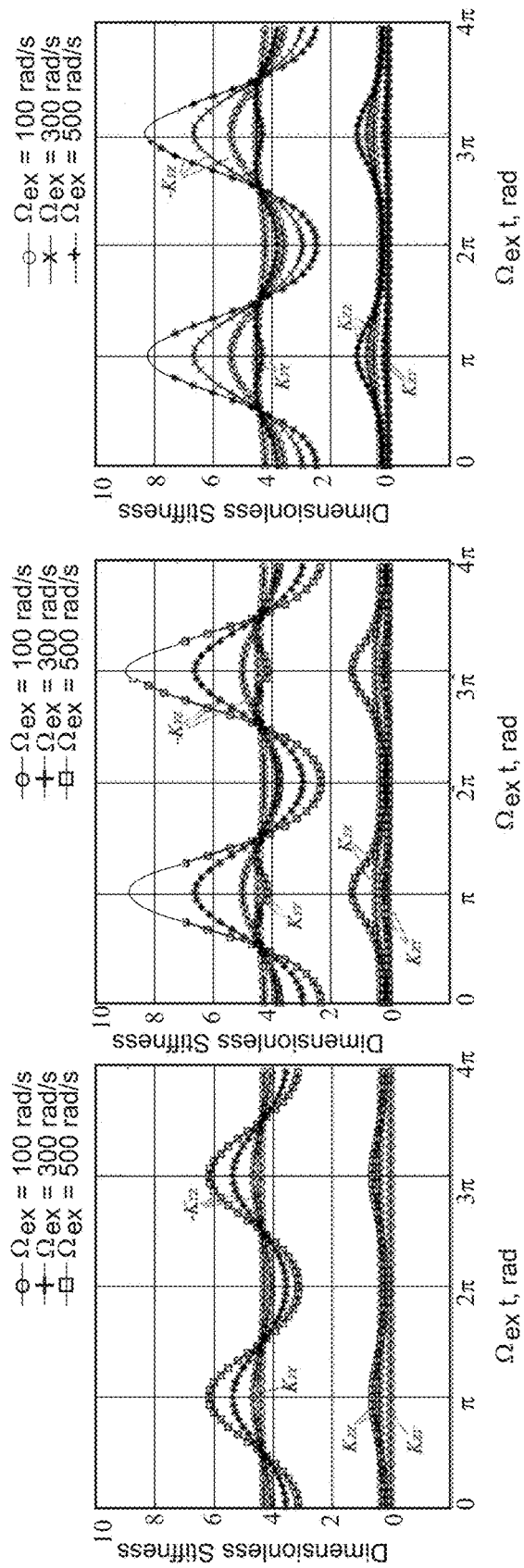
FIG. 16 depicts a plot showing stiffness coefficient of the 2-pad design as function of time and amplitude of pad displacement of $d_0=5\%$ c (with variable cases of excitation frequency $\Omega_{ex}$ and So=1
FIG. 17 depicts a plot showing stiffness coefficient of the 2-pad design as function of time and amplitude of pad displacement of $d_0=10\%$ c (with variable cases of excitation frequency $\Omega_{ex}$ and So=1
FIG. 18 depicts a plot showing stiffness coefficient of the 2-pad design as function of time and amplitude of pad displacement of $d_0=15\%$ c (with variable cases of excitation frequency $\Omega_{ex}$ and So=1

FIGS. 14 and 15 depict plots of the stiffness coefficient and damping coefficient for L/D=0.75. This value applies in many turbine bearings and related applications. Data for the plots result from applying a small perturbation in the shaft 104 with respect to displacement at select points of equilibrium (in FIGS. 12 and 13). The coefficients are compared with the same corresponding to a plain circular 360° bearing that is evaluated in the same way. In this connection, the cross-coupling stiffness coefficient $K_{ZY}$ appears sensibly lower in the entire range of Sommerfeld number for both 2-pad and 3-pad configurations as compared to full cylindrical bearings. The cross-coupling stiffness coefficient $K_{YZ}$ appears slightly higher in the heavier cases (So<0.5) and slightly higher in the lighter loading cases (So>0.5) for both the 2-pad and 3-pad bearing configurations compared to full cylindrical bearings. The direct stiffness coefficient $K_{YY}$ in the vertical direction (e.g., the direction of load) is higher in the 2-pad and 3-pad configurations as compared to the full cylindrical bearing for the entire range of Sommerfeld number. Conversely, in the horizontal direction, the full cylindrical bearing appears to be less stiff compared to the 2-pad and 3-pad configuration in the entire range of Sommerfeld number, considering the progress of $K_{ZZ}$ in the plots. The divergence of stiffness coefficient $K_{ZZ}$ between full and "arc" bearing gets slightly higher for lower loads (So~5).

The ability of the fluid film to provide stiffness and damping to the rotor 104 changes with respect to the operating conditions of the bearing 100. The fluid film forces obtain different sensitivity to perturbations that can happen to the rotor 104, for example, in regard to displacement and velocity of the shaft 104 in lower or higher eccentricities. Any movement of lubricating surfaces of the shaft 104 and the bearing 100 may have different influences in the resulting forces of fluid film, comparing low and high eccentricity of operation.

FIGS. 16, 17, 18, 19, 20, 21 depict plots of stiffness coefficient as relates to excitation (or displacement) of the pads 148. The plots reflect Sommerfeld number of So=1 for three different operating cases with $d_0$=5% c, $d_0$=10% c, and $d_0$=15% c and excitation frequency at $\Omega_{ex}$=100 rad/s, $\Omega_{ex}$=200 rad/s, and $\Omega_{ex}$=300 rad/s, etc. The values for excitation frequency $\Omega_{ex}$ are comparable for rotor-bearing systems in turbo-machinery and like industrial turbines, where $1^{st}$ and $2^{nd}$ or even $3^{rd}$ critical speed operate within a range of 100 rad/s to 900 rad/s. It can be observed in these plots that the frequency of the pad excitation has a significant influence on the variation of the stiffness coefficient regardless of the amplitude of excitation, supporting incorporation of the bearing pad velocity in Reynolds equation as beneficial regarding the approximation in this analysis.

Referring also to FIG. 7, the 2-pad and 3-pad designs can also be simulated as might occur on the turbine 102. This simulation may leverage the Transient Transfer Matrix Method (TTMM) and the basic geometrical and physical properties for the turbine 102 shown in Tables 5 and 6 below,

TABLE 5

Rotor & Blades

| Property | Value |
|---|---|
| Mass | M = 5000 Kg |
| Slender ratio | L/D = 9 |
| Youngs modulus | E = 210 GPa |
| $1^{st}$ natural freq. | $\Omega_1$ = 240 rad/s |
| Operating speed | $\Omega/\Omega_1$ = 3 |

TABLE 6

| Property | Bearing #1 Value | Bearing #2 Value |
|---|---|---|
| $L_b/D_b$ ratio | 0.75 | 0.75 |
| Radial clearance | c ≈ $D_b$/1000 | c ≈ $D_b$/1000 |
| Oil Visc. | μ = 0.03 Pa * s | μ = 0.03 Pa * s |
| So | 0.8 | 0.6 |

In one implementation, linear bearing impedance forces may operate on the bearings 100 that are disposed laterally apart from one another on the rotor ends 166, 168 under the principle of period variation of the stiffness coefficient and the damping coefficient, as set forth, respectively, in Equations (22) and (23) below, $$\begin{bmatrix} \overline{K}_{YY}(\Omega, t) & \overline{K}_{YZ}(\Omega, t) \\ \overline{K}_{ZY}(\Omega, t) & \overline{K}_{ZZ}(\Omega, t) \end{bmatrix} = \quad \text{Equation (22)}$$

$$(1 + \varepsilon_{ij}\sin(\Omega_{ex}t))\begin{bmatrix} K_{YY}(\Omega) & K_{YZ}(\Omega) \\ K_{ZY}(\Omega) & K_{ZZ}(\Omega) \end{bmatrix},$$

$$\begin{bmatrix} \overline{C}_{YY}(\Omega, t) & \overline{C}_{YZ}(\Omega, t) \\ \overline{C}_{ZY}(\Omega, t) & \overline{C}_{ZZ}(\Omega, t) \end{bmatrix} = \quad \text{Equation (23)}$$

$$(1 + \varepsilon_{ij}\sin(\Omega_{ex}t))\begin{bmatrix} C_{YY}(\Omega) & C_{YZ}(\Omega) \\ C_{ZY}(\Omega) & C_{ZZ}(\Omega) \end{bmatrix},$$

where $\varepsilon_y$ is the approximate variation of the coefficient $\overline{K}_y$, $\overline{C}_y$ according to the evaluations above.

The linear transient response is evaluated for various constant speed values on the range of $\Omega/\Omega_1$=0~10 wherein $\Omega_1$ is the $1^{st}$ un-damped rigid support bending natural frequency defined approximately as set forth in Equation (24) below, $$\Omega_n = (n\pi)^2 \sqrt{EI/M/L^3}. \quad \text{Equation (24)}$$

FIG. 22 depicts plots to illustrate instability thresholds for the turbine 102 of FIG. 7 using the 2-pad design for the bearings 100. This stability assessment for a linear system of time-period characteristics uses Floquet theory for various amplitudes $\varepsilon_{YY}$. This method can numerically evaluate the system's response at various given speeds for a number of periods of the system's periodic variation of stiffness and damping and for different initial conditions. The result may be the monodromy matrix of the system. The eigenvalues of the monodromy matrix declare the stable or unstable progress of the response. For the adjustable bearings proposed herein, the period of variation of the system's properties is defined as =$2\pi/\Omega_{ex}$. The plots correspond to stability of the system for various cases of $\Omega/\Omega_1$=0~10 and $\Omega_{ex}/\Omega_1$=0~10 with $\varepsilon_{YY}$=0, 0.1, 0.2, . . . 0.5 and the rest $\varepsilon_{ij}$.

Figures 19, 20, 21:
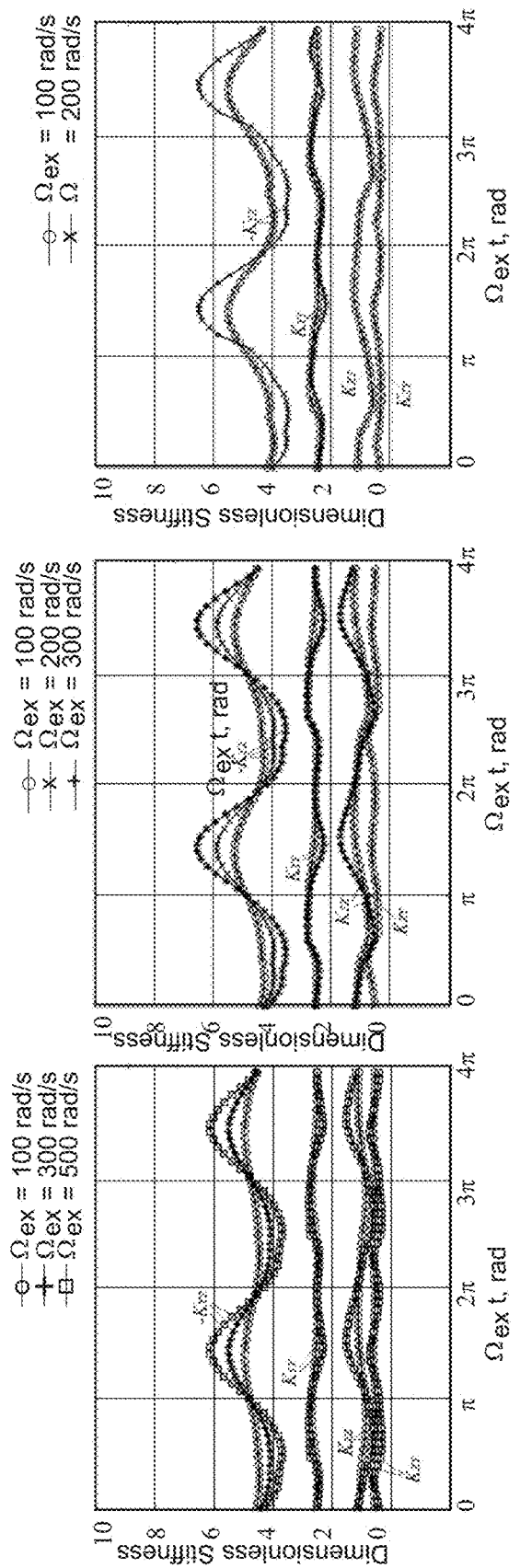
FIG. 19 depicts a plot showing stiffness coefficient of the 3-pad design as function of time and amplitude of pad displacement of $d_0=5\%$ c (with variable cases of excitation frequency $\Omega_{ex}$ and So=1
FIG. 20 depicts a plot showing stiffness coefficient of the 3-pad design as function of time and amplitude of pad displacement of $d_0=10\%$ c (with variable cases of excitation frequency $\Omega_{ex}$ and So=1
FIG. 21 depicts a plot showing stiffness coefficient of the 3-pad design as function of time and amplitude of pad displacement of $d_0=15\%$ c (with variable cases of excitation frequency $\Omega_{ex}$ and So=1.

Referring to FIG. 21, the system experiences stable response at rotating speeds around less than $\Omega$=$2\Omega_1$, when $\varepsilon_Y$=0 independent of the value for $\Omega_{ex}$. Increasing the rotating speed further appears to destabilize the system, as it enters instability thresholds except if the frequency of stiffness and damping variation is of specific values that introduce parametric anti-resonance. Some candidate values of $\Omega_{ex}$ that would introduce parametric anti-resonance in the system are show below in Equations (25) and (26), $$\Omega_{ex} = \frac{(\Omega_2 - \Omega_1)}{n} (n \in \mathbb{Z}^*), \quad \text{Equation (25)}$$

if the system's stiffness and damping matrices are symmetrical, or $$\Omega_{ex} = \frac{(\Omega_2 + \Omega_1)}{n}, \quad \text{Equation (26)}$$

if the system's stiffness and damping matrices are not symmetrical.

The system's second natural frequency in bending is defined approximately as shown in Equation (27), $$\Omega_2 = (2\pi)^2 \sqrt{EI/M/L^3} \text{ or } \Omega_2 = 4\Omega_1. \quad \text{Equation (27)}$$

The values of natural frequencies $\Omega_n$ are very approximating and may be used as an indication for the expected thresholds of parametric anti-resonance. When parametric anti-resonance is introduced, leading to stability, e.g., at $2 < \Omega_{ex}/\Omega_1 < 3$. Parametric resonance also occurs in frequencies $\Omega_{ex}/\Omega_1 < 2$ or $\Omega_{ex}/\Omega_1 > 3$; but this does not affect the possibility of performing a run-up of the machine up to $\Omega/\Omega_1 > 6$ without entering instability thresholds.

FIG. 23 depicts plots of displacement of the rotor at a bearing location is plotted as a function of time for several periods. Here, it is apparent that at a selected rotating speed of $\Omega/\Omega_1 = 2$, the system would be unstable in the absence of parametric excitation in certain frequencies. But as long as parametric excitation occurs at a selected frequency of $\Omega/\Omega_{ex} = 2.6$, the displacement amplitude decreases in time. This feature indicates stable operation of the system. The excitation frequency $\Omega_{ex}$ could vary according to the operating speed $\Omega$, so both to intersect in a region of FIG. X where stability is indicated. FIG. X also shows that the impact of parametric excitation to introduce stability is more intense as the amplitude of bearing properties variation $\varepsilon_{yy}$ increases.

With reference to FIG. 24, modal interaction between $1^{st}$ and $2^{nd}$ mode is introduced from the adjustable bearing and the principle of transfer of vibration energy between two modes is taking place. FIG. 24 depicts the unbalance response through 2 critical speeds of a turbine rotor of very similar configuration to that described in Tables 5 and 6. The modal interaction occurs when the excitation frequency is defined as the difference of the $2^{nd}$ minus the $1^{st}$ critical speed, see Equation (28), $$\Omega_{ex} = \frac{(\Omega_2 - \Omega_1)}{1} = 3.95\Omega_0 - \Omega_0 = 2.95\Omega_0, \quad \text{Equation (28)}$$

The 1st critical speed ($1^{st}$ mode) amplitude in the bearing midspan is then decreased as the parameter $\varepsilon_y$ increases from 0 to 0.4, 0.6, and 0.8 as shown in FIG. 24.

CONCLUSION

In light of the foregoing, the proposed partial-arc journal bearings of variable geometry benefit operation of turbines and turbo-machinery, as well as other applications for journal bearings. Introducing parametric excitation of the system's properties of stiffness and damping at certain frequencies at which parametric anti-resonance occurs can eliminate instabilities at theoretically very high rotating speed. Adjusting the rotor center (alignment) on real-time at the desired position can accommodate for placement not achieved in design or fabrication, for example, due to manufacturing or installation reasons or due to thermal distortion of stator or other components after long time operation. Use of the proposed designs can further provide optimum clearance and preload in a certain operation condition to achieve optimum operation of the journal bearing regarding friction co-efficient and minimize the journal bearing power losses. A technical effect is to promote active vibration suppression during operation of the turbine.

The proposed design is an improvement over plain, cylindrical bearings. Generally, plain cylindrical bearings would experience bearing instability at about $\Omega = 2\Omega_1$. Relatively enhanced stability margins are noticed using the adjustable bearing configurations as compared to circular bearing profile that would hardly achieve stability at a rated speed of $\Omega/\Omega_1 \sim 3$. For this reason, practice often uses tilting-pad bearings in the design of machines so as to assure stable bearing operation. But use of the principle of parametric excitation of the system through the proposed adjustable bearings can extend stability margins to much higher rotating speeds, e.g., possibly up to $\Omega/\Omega_1 > 6$. As it is shown in FIG. 22, the application of higher amplitude of bearing pad displacement $\delta$ and consequently in higher $\Sigma_{ij}$ yields a wider stable area of combinations and the transition from lower to higher operating speeds can occur without entering instability thresholds.

In some implementations, one or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). As noted herein, exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the disclosed subject matter may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A bearing system, comprising:
   a casing having a bore with a center axis, the bore having an interior surface with openings disposed between portions having a variable radius measured from the center axis;
   a first pad and a second pad disposed in the casing at the openings, each forming an arcuate carrying surface with a constant radius, the arcuate carrying surface being radially moveable in a direction perpendicular to the center axis of the bore;
   a port disposed in the casing, the port having an aperture that provides access to interior of the casing, the aperture being located in at least one of the portions having the variable radius;
   a first actuator and a second actuator coupled with the first pad and the second pad, respectively; and
   a controller that uses feedback about the shaft to actuate the first actuator and the second actuator to displace the first pad and the second pad relative to the center axis in response to conditions inside the casing, and
   wherein displacement of the first pad and the second pad results in a film of lubricant having a thickness that varies with respect to the arcuate carrying surface area of the first pad and the second pad.

2. The bearing of claim 1, wherein the first pad and the second pad are spaced apart annularly from one another about the center axis.

3. The bearing of claim 1, wherein the first pad and the second pad oppose each other on opposite sides of the center axis.

4. The bearing of claim 1, wherein the first pad and the second pad have adjacent ends that are annularly offset from one another by less than 180°.

5. The bearing of claim 1, wherein the arcuate carrying surface has an arc length that is the same on the first pad as on the second pad.

6. The bearing of claim 1, further comprising a third pad also having the arcuate carrying surface and radially moveable in a direction perpendicular to the center axis, wherein the arcuate carrying surface of the first pad, the second pad, and the third pad, in aggregate, have an arc length that amounts to less than 360°.

7. The bearing of claim 1, wherein the portions with the variable radius occur at three places in the interior surface.

8. The bearing of claim 1, wherein the portions with the variable radius are diametrically-opposed to one another.

9. The bearing of claim 1, wherein the displacement of the first pad and the second pad either introduces parametric anti-resonance into the bearing system or introduces modal interaction that transfers vibration energy from a first mode to a second mode in the bearing system when excitation frequency corresponds to a difference between first and second critical speeds of a turbine rotor.

10. Turbo-machinery, comprising:
    a shaft;
    a bearing system with a casing having a bore receiving the shaft, the bore having a center axis and an interior surface with openings disposed between portions having a variable radius as measured from the center axis, the bearing system comprising a first pad and a second pad disposed in the openings, each having a carrying surface forming an arc of constant radius that circumscribe an annular portion of the shaft, the bearing system further comprising a lubricant disposed between the carrying surface and the shaft, the lubricant forming a film;
    a port disposed in the casing, the port having an aperture that provides access to interior of the casing, the aperture being located in at least one of the portions having the variable radius;
    a first actuator and a second actuator coupled to the first pad and the second pad, respectively;
    sensors to monitor operating conditions of the rotor; and
    a controller coupled with the sensors and with the first actuator and the second actuator, the controller uses feedback about the shaft to actuate the first actuator and the second actuator to move the first pad and the second pad relative to the shaft in response to the operating conditions to vary thickness of the film, and
    wherein displacement of the first pad and the second pad results in a thickness of the film that varies with respect to the arcuate carrying surface area of the first pad and the second pad.

11. The turbo-machinery of claim 10, wherein the bearing comprises a third pad, also having the carrying surface, wherein the carrying surface of the first pad, the second pad, and the third pad, in aggregate, have an arc length that amounts to less than 360°.

12. The turbo-machinery of claim 10, wherein the portions with the variable radius occur at three places in the interior surface.

13. The turbo-machinery of claim 10, wherein the portions with the variable radius are diametrically-opposed to one another.

14. The turbo-machinery of claim 11, wherein the displacement of the first pad and the second pad introduces modal interaction that transfers vibration energy from a first mode to a second mode in the bearing system when excitation frequency corresponds to a difference between first and second critical speeds of the turbo-machinery.

* * * * *